No. 879,588. PATENTED FEB. 18, 1908.
G. RIEXINGER.
FLEXIBLE PIPE JOINT.
APPLICATION FILED FEB. 2, 1907.
2 SHEETS—SHEET 1.
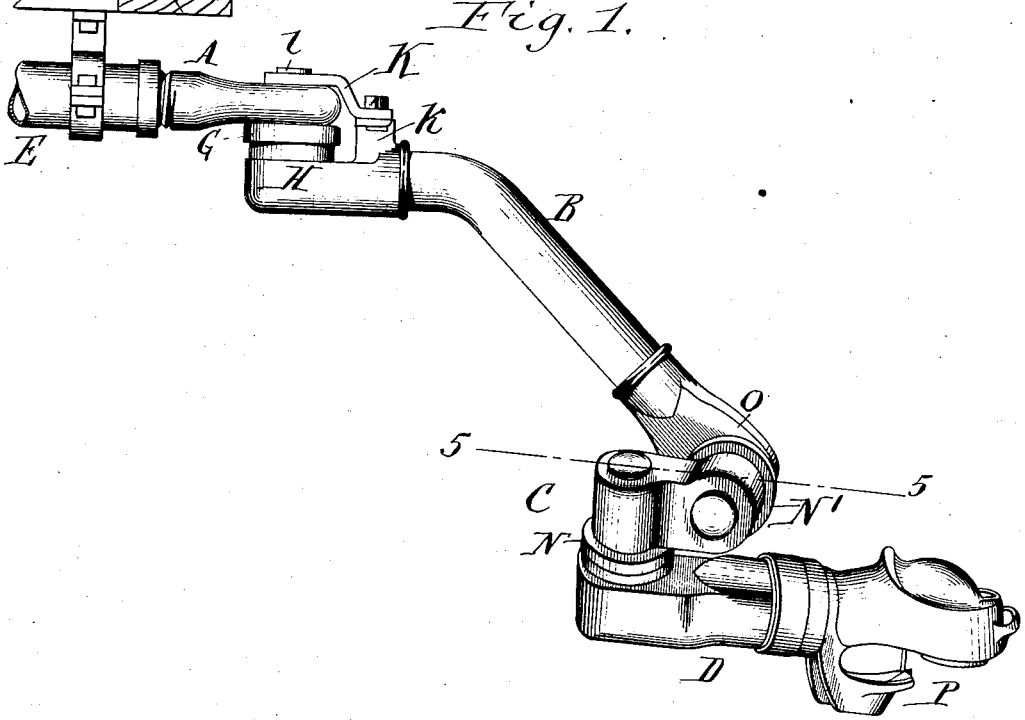
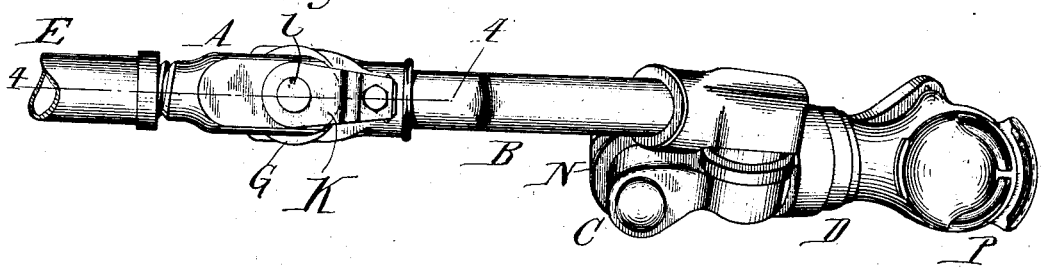
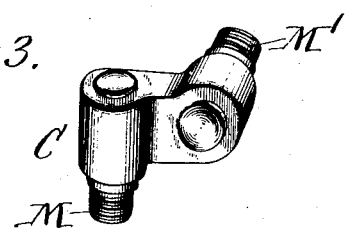
Witnesses:
Richard Sommer
Gustav W. Hora.
Inventor
George Riexinger
by Geyer & Popp
Attorneys.

No. 879,588.

PATENTED FEB. 18, 1908.

G. RIEXINGER.
FLEXIBLE PIPE JOINT.
APPLICATION FILED FEB. 2, 1907

2 SHEETS—SHEET 2.

Witnesses:
Richard Sommer
Gustav N. Hora.

Inventor
George Riexinger
by Geyer & Popp
Attorneys.

UNITED STATES PATENT OFFICE.

GEORGE RIEXINGER, OF BUFFALO, NEW YORK.

FLEXIBLE PIPE-JOINT.

No. 879,588.  Specification of Letters Patent.  Patented Feb. 18, 1908.

Application filed February 2, 1907. Serial No. 355,450.

*To all whom it may concern:*

Be it known that I, GEORGE RIEXINGER, a citizen of the United States, residing at Buffalo, in the county of Erie and State of New York, have invented a new and useful Improvement in Flexible Pipe-Joints, of which the following is a specification.

This invention relates more particularly to the flexible metallic piping employed for connecting the air, water, gas and steam pipes of adjoining railway-cars.

The object of the invention is the provision of a strong and durable joint for such piping which is absolutely tight and reliable.

Figure 4:
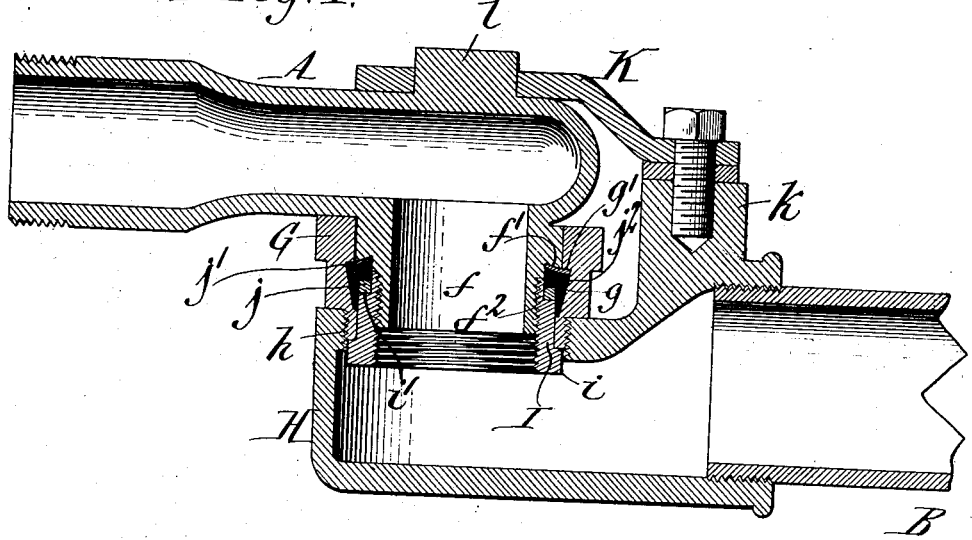
Figure 5:
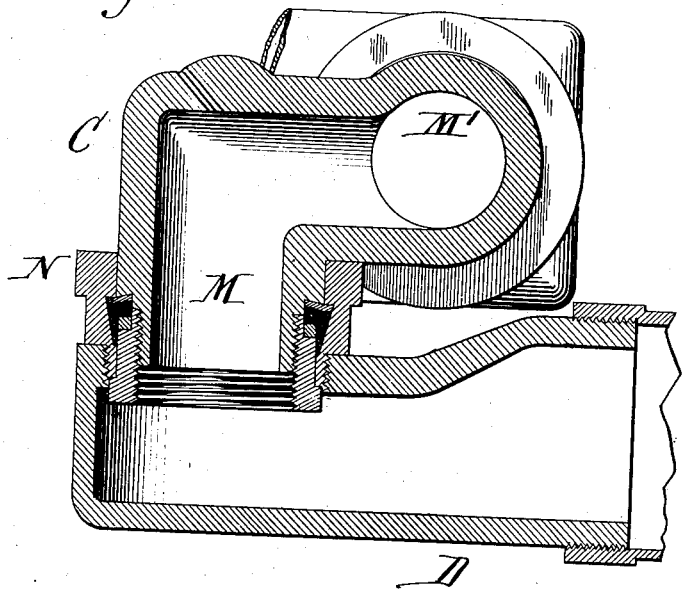

In the accompanying drawings consisting of 2 sheets: Figure 1 is a side elevation of the piping connected to the air or steam pipe of a car. Fig. 2 is a top plan view of the same. Fig. 3 is a detached perspective view of the right-angle fitting forming part of the piping. Fig. 4 is a longitudinal section, on an enlarged scale, in line 4—4, Fig. 2. Fig. 5 is a similar section in line 5—5, Fig. 1.

Similar letters of reference indicate corresponding parts throughout the several views.

The piping shown in the drawings comprises four main sections or members A, B, C, D connected by joints arranged at different angles to give the same the capacity of universal motion, as required in train-connections. The member A consists of a short pipe section or fitting adapted to be screwed into the air or steam pipe E of a railway-car. As best shown in Fig. 4, this fitting is closed at its front end and provided with a downwardly-extending hollow journal or nipple $f$ having an external shoulder $f^1$ which is preferably undercut, as shown, while its lower portion is reduced and screw threaded externally, as shown at $f^2$.

G indicates a coupling ring or collar snugly surrounding the large unthreaded upper portion of the nipple $f$ and having a reduced externally screw threaded lower end which engages a screw threaded opening $h$ formed in the upper flat side of a hollow head or fitting H. The latter is closed at its rear end and secured at its front end to the inclined member B of the piping with which it communicates. The coupling ring G is retained upon the nipple $f$ by an annular nut or thimble I arranged in the ring and screwed upon the threaded end of the nipple and having an external flange or shoulder $i$ which bears against the lower end of the ring. The bore of the coupling ring is recessed or undercut, as shown at $g$, to form an internal shoulder $g^1$ which is located in line with the shoulder $f^1$ of the nipple. The nut I is provided within the coupling ring with an external shoulder $i^1$ between which and the shoulders $f^1$ and $g^1$ a suitable packing is interposed to form a tight joint between the nipple and the coupling ring. This packing preferably consists of a leather gasket $j$ resting against the shoulder $i^1$ of the nut, a similar gasket $j^1$ resting against the shoulders $f^1$, $g^1$ of the nipple and the coupling ring and extending across the joint between the same and asbestos packing $j^2$ filling the space between said gaskets. The nut I is small enough in diameter to pass through the opening $h$ of the head H. In order to stiffen the parts of the joint just described, they may be connected by a brace K bolted at its front end to a lug $k$ projecting from the head H and pivoted at its rear end upon a vertical stud $l$ arranged on the upper side of the member A in axial alinement with the nipple $f$.

This improved joint while being absolutely tight, permits the head H and the pipe members carried thereby to turn freely in a horizontal plane, the head being rigidly secured to the coupling ring G and the latter turning upon the nipple $f$ and the cylindrical surface of the nut I.

In assembling the parts of the joint, the gasket $j^1$ and the packing $j^2$ are first placed in the coupling ring G, and the latter is then passed over the nipple $f$. The nut I with the gasket $j^1$ applied to it, is next screwed upon the end of the nipple and tightened, thus compressing said gaskets and packing and forming a tight joint between the coupling ring and the nipple. The opening of the head H is then passed over the nut I and the coupling ring G is tightly screwed into said opening; and finally the brace K is applied.

The members B and D are preferably connected with the hollow member or fitting C by joints of the same construction as that above described but arranged at different angles to render the piping capable of universal movement. In the construction shown in the drawings, the member C has nipples M, M$^1$ arranged at right angles to each other, the nipple M$^1$ being at right angles to the nipple $f$ but in a somewhat inclined position. As the joints of which the nipples M, M$^1$ form members are the same as that first described, a detailed description and illustration of them is unnecessary. It will suffice to state that N, N¹ are the respective coupling rings of said joints which engage screw threaded openings in the sides of the member D and a hollow head or fitting o secured to the lower end of the pipe section B. The foremost member of the flexible piping carries a coupling P of any suitable or well known construction which is adapted to interlock with the corresponding coupling of an opposing railway car, in a common manner.

While my improved joint is herein shown and described in connection with flexible piping for railway cars, I do not wish to be confined to that use, as the improvement is generally useful for connecting pipes or hollow members requiring a swinging or swiveling movement.

I claim as my invention:—

1. A pipe-joint comprising two hollow members, one having a nipple and the other an opening, a coupling ring surrounding said nipple and secured in said opening, and a nut smaller than said opening applied to said nipple and arranged within the interior of said coupling ring, said nut having means engaging the inner end of the coupling ring, substantially as set forth.

2. A pipe-joint comprising two hollow members, one having a nipple and the other an opening, a coupling ring surrounding said nipple and secured in said opening, packing interposed between the nipple and the coupling ring, and a nut smaller than said opening applied to said nipple, arranged within the interior of said coupling ring and bearing against said packing, said nut having means engaging the inner end of the coupling ring, substantially as set forth.

3. A pipe joint, comprising two hollow members, one having a screw-threaded nipple and the other an opening, a coupling ring surrounding said nipple and secured in said opening, said nipple and said ring being provided in their adjacent walls with shoulders, a screw-threaded member engaging said nipple and arranged within the interior of said ring, and packing interposed between said screw threaded member and said shoulders, substantially as set forth.

4. A pipe joint, comprising two hollow members, one having a screw-threaded nipple and the other an opening, a coupling ring surrounding said nipple and secured in said opening, a retaining nut applied to said nipple within the coupling ring and engaging the end of the ring, said nipple having an external shoulder and said ring an internal shoulder coinciding with said external shoulder, and packing interposed between said nut and said shoulders and extending across the joint between the latter, substantially as set forth.

5. A pipe joint, comprising two hollow members, one having a threaded opening and the other an externally threaded nipple having an external undercut shoulder, a threaded coupling ring surrounding said nipple, engaging said opening and having an internal shoulder arranged in line with the shoulder of the nipple, an annular nut arranged in said ring and engaging the nipple, said nut being provided within the ring with a shoulder and at its end with a flange which bears against the adjacent end of the ring, and packing gaskets interposed between the shoulder of the nut and the shoulders of the nipple and coupling ring, substantially as set forth.

Witness my hand this 25th day of January, 1907.

GEORGE RIEXINGER.

Witnesses:
THOMAS RIEXINGER,
C. F. GEYER.